(12) United States Patent
Balasubramanian et al.

(10) Patent No.: US 11,893,385 B2
(45) Date of Patent: Feb. 6, 2024

(54) METHODS AND SYSTEMS FOR AUTOMATED SOFTWARE NATURAL LANGUAGE DOCUMENTATION

(71) Applicant: Open Weaver Inc., Miami, FL (US)

(72) Inventors: Ashok Balasubramanian, Chennai (IN); Karthikeyan Krishnaswamy Raja, Chennai (IN)

(73) Assignee: Open Weaver Inc., Miami, FL (US)

( * ) Notice: Subject to any disclaimer, the term of this patent is extended or adjusted under 35 U.S.C. 154(b) by 60 days.

(21) Appl. No.: 17/589,274

(22) Filed: Jan. 31, 2022

(65) Prior Publication Data
US 2022/0261241 A1   Aug. 18, 2022

Related U.S. Application Data

(60) Provisional application No. 63/150,395, filed on Feb. 17, 2021.

(51) Int. Cl.
*G06F 8/73* (2018.01)
*G06F 8/75* (2018.01)
(Continued)

(52) U.S. Cl.
CPC .............. *G06F 8/73* (2013.01); *G06F 8/433* (2013.01); *G06F 8/75* (2013.01); *G06F 18/214* (2023.01); *G06F 40/14* (2020.01); *G06N 3/04* (2013.01)

(58) Field of Classification Search
None
See application file for complete search history.

(56) References Cited

U.S. PATENT DOCUMENTS 5,953,526 A * 9/1999 Day .................... G06F 8/73
   717/118
7,322,024 B2   1/2008 Carlson et al.
(Continued)

FOREIGN PATENT DOCUMENTS

CN         108052442 A      5/2018
KR      10-2020-0062917     6/2020
(Continued)

OTHER PUBLICATIONS

Leclair et al., "A Neural Model for Generating Natural Language Summaries of Program Subroutines," Collin McMillan, Dept. of Computer Science and Engineering, University of Notre Dame Notre Dame, IN, USA, Feb. 5, 2019.
(Continued)

*Primary Examiner* — Jason D Mitchell
(74) *Attorney, Agent, or Firm* — Foley & Lardner LLP

(57) ABSTRACT

Systems and methods for automatically generating natural language documentation for source code files are provided. An exemplary method includes parsing a source code file to extract a function and generate an abstract syntax tree, generating first natural language documentation for each of a plurality of program statements within the function using a programming language neural network model, generating second natural language documentation for the function as a whole by processing a code snippet of the function using a function documentation neural network model, consolidating the first natural language documentation and the second natural language documentation at a function level, a source file level, and a project level to create consolidated natural language documentation, and summarizing multiple sentences of the consolidated natural language documentation into an abstract summary of the source code file by applying a set of rules.

19 Claims, 8 Drawing Sheets

(51) Int. Cl.
*G06F 40/14* (2020.01)
*G06N 3/04* (2023.01)
*G06F 8/41* (2018.01)
*G06F 18/214* (2023.01)

(56) References Cited

U.S. PATENT DOCUMENTS

| | | |
|---|---|---|
| 7,703,070 B2 | 4/2010 | Bisceglia |
| 7,774,288 B2 | 8/2010 | Acharya et al. |
| 7,958,493 B2 | 6/2011 | Lindsey et al. |
| 8,010,539 B2 | 8/2011 | Blair-Goldensohn et al. |
| 8,051,332 B2 | 11/2011 | Zakonov et al. |
| 8,112,738 B2 | 2/2012 | Pohl et al. |
| 8,112,744 B2 | 2/2012 | Geisinger |
| 8,219,557 B2 | 7/2012 | Grefenstette et al. |
| 8,296,311 B2 | 10/2012 | Rapp et al. |
| 8,412,813 B2 | 4/2013 | Carlson et al. |
| 8,417,713 B1 | 4/2013 | Blair-Goldensohn et al. |
| 8,452,742 B2 | 5/2013 | Hashimoto et al. |
| 8,463,595 B1 | 6/2013 | Rehling et al. |
| 8,498,974 B1 | 7/2013 | Kim et al. |
| 8,627,270 B2 | 1/2014 | Fox et al. |
| 8,677,320 B2 | 3/2014 | Wilson et al. |
| 8,688,676 B2 | 4/2014 | Rush et al. |
| 8,838,606 B1 | 9/2014 | Cormack et al. |
| 8,838,633 B2 | 9/2014 | Dhillon et al. |
| 8,935,192 B1 | 1/2015 | Ventilla et al. |
| 8,943,039 B1 | 1/2015 | Grieselhuber et al. |
| 9,015,730 B1 | 4/2015 | Allen et al. |
| 9,043,753 B2 | 5/2015 | Fox et al. |
| 9,047,283 B1 | 6/2015 | Zhang et al. |
| 9,135,665 B2 | 9/2015 | England et al. |
| 9,176,729 B2 | 11/2015 | Mockus et al. |
| 9,201,931 B2 | 12/2015 | Lightner et al. |
| 9,268,805 B2 | 2/2016 | Crossley et al. |
| 9,330,174 B1 | 5/2016 | Zhang |
| 9,361,294 B2 | 6/2016 | Smith |
| 9,390,268 B1 | 7/2016 | Martini et al. |
| 9,471,559 B2 | 10/2016 | Castelli et al. |
| 9,589,250 B2 | 3/2017 | Palanisamy et al. |
| 9,626,164 B1 | 4/2017 | Fuchs |
| 9,672,554 B2 | 6/2017 | Dumon et al. |
| 9,977,656 B1 | 5/2018 | Mannopantar et al. |
| 10,484,429 B1 | 11/2019 | Fawcett et al. |
| 10,761,839 B1 | 9/2020 | Migoya et al. |
| 10,922,740 B2 | 2/2021 | Gupta et al. |
| 11,461,093 B1 | 10/2022 | Edminster et al. |
| 11,474,817 B2 | 10/2022 | Sousa et al. |
| 2001/0054054 A1 | 12/2001 | Olson |
| 2002/0059204 A1 | 5/2002 | Harris |
| 2002/0150966 A1 | 10/2002 | Muraca |
| 2002/0194578 A1 | 12/2002 | Irie et al. |
| 2004/0243568 A1 | 12/2004 | Wang et al. |
| 2006/0090077 A1 | 4/2006 | Little et al. |
| 2006/0200741 A1 | 9/2006 | Demesa et al. |
| 2006/0265232 A1 | 11/2006 | Katariya et al. |
| 2007/0050343 A1 | 3/2007 | Siddarampa et al. |
| 2007/0185860 A1 | 8/2007 | Lissack |
| 2007/0234291 A1 | 10/2007 | Ronen et al. |
| 2007/0299825 A1 | 12/2007 | Rush et al. |
| 2009/0043612 A1 | 2/2009 | Szela et al. |
| 2009/0319342 A1 | 12/2009 | Shilman et al. |
| 2010/0106705 A1 | 4/2010 | Rush et al. |
| 2010/0121857 A1 | 5/2010 | Elmore et al. |
| 2010/0174670 A1 | 7/2010 | Malik et al. |
| 2010/0205198 A1 | 8/2010 | Mishne et al. |
| 2010/0205663 A1 | 8/2010 | Ward et al. |
| 2010/0262454 A1 | 10/2010 | Sommer et al. |
| 2011/0231817 A1 | 9/2011 | Hadar et al. |
| 2012/0143879 A1 | 6/2012 | Stoitsev |
| 2012/0259882 A1 | 10/2012 | Thakur et al. |
| 2012/0278064 A1 | 11/2012 | Leary et al. |
| 2013/0103662 A1 | 4/2013 | Epstein |
| 2013/0117254 A1 | 5/2013 | Manuel-Devadoss et al. |
| 2013/0326469 A1 | 12/2013 | Fox et al. |
| 2014/0040238 A1 | 2/2014 | Scott et al. |
| 2014/0075414 A1 | 3/2014 | Fox et al. |
| 2014/0163959 A1 | 6/2014 | Hebert et al. |
| 2014/0188746 A1 | 7/2014 | Li |
| 2014/0297476 A1 | 10/2014 | Wang et al. |
| 2014/0337355 A1 | 11/2014 | Heinze |
| 2015/0127567 A1 | 5/2015 | Menon et al. |
| 2015/0220608 A1 | 8/2015 | Crestani Campos et al. |
| 2015/0331866 A1 | 11/2015 | Shen et al. |
| 2016/0253688 A1 | 9/2016 | Nielsen et al. |
| 2016/0350105 A1* | 12/2016 | Kumar .................. G06F 8/74 |
| 2016/0378618 A1 | 12/2016 | Cmielowski et al. |
| 2017/0034023 A1 | 2/2017 | Nickolov et al. |
| 2017/0063776 A1 | 3/2017 | Nigul |
| 2017/0220633 A1 | 8/2017 | Porath et al. |
| 2017/0286541 A1 | 10/2017 | Mosley et al. |
| 2018/0046609 A1 | 2/2018 | Agarwal et al. |
| 2018/0067836 A1 | 3/2018 | Apkon et al. |
| 2018/0114000 A1 | 4/2018 | Taylor |
| 2018/0329883 A1 | 11/2018 | Leidner et al. |
| 2019/0278933 A1* | 9/2019 | Bendory ................ G06F 8/70 |
| 2019/0311044 A1 | 10/2019 | Xu et al. |
| 2019/0324981 A1 | 10/2019 | Counts et al. |
| 2020/0110839 A1 | 4/2020 | Wang et al. |
| 2020/0125482 A1* | 4/2020 | Smith .................. G06N 3/045 |
| 2020/0133830 A1 | 4/2020 | Sharma et al. |
| 2020/0293354 A1* | 9/2020 | Song ..................... G06F 8/71 |
| 2020/0348929 A1 | 11/2020 | Sousa et al. |
| 2020/0356363 A1 | 11/2020 | Dewitt et al. |
| 2021/0049091 A1 | 2/2021 | Hikawa et al. |
| 2021/0141863 A1 | 5/2021 | Wu et al. |
| 2021/0149668 A1* | 5/2021 | Gupta ................... G06F 9/547 |
| 2021/0349801 A1 | 11/2021 | Rafey |
| 2021/0357210 A1* | 11/2021 | Clement ............... G06N 3/084 |
| 2021/0382712 A1 | 12/2021 | Richman et al. |
| 2022/0012297 A1 | 1/2022 | Basu et al. |
| 2022/0083577 A1 | 3/2022 | Yoshida et al. |
| 2022/0261241 A1* | 8/2022 | Balasubramanian .... G06N 3/04 |
| 2022/0269580 A1* | 8/2022 | Balasubramanian ..... G06F 8/73 |
| 2023/0308700 A1 | 9/2023 | Perez |

FOREIGN PATENT DOCUMENTS

| | | |
|---|---|---|
| WO | WO-2007/013418 | 2/2007 |
| WO | WO-2020/086773 A1 | 4/2020 |

OTHER PUBLICATIONS

Lampropoulos et al, "REACT—A Process for Improving Open-Source Software Reuse", IEEE, pp. 251-254 (Year: 2018).

Schweik et al, Proceedings of the OSS 2011 Doctoral Consortium, Oct. 5, 2011, Salvador, Brazil, pp. 1-100, Http://Avorks.bepress.com/charles_schweik/20 (Year: 2011).

Stanciulescu et al, "Forked and Integrated Variants in an Open-Source Firmware Project", IEEE, pp. 151-160 (Year: 2015).

Zaimi et al, ":An Empirical Study on the Reuse of Third-Party Libraries in Open-Source Software Development", ACM, pp. 1-8 (Year: 2015).

Iderli Souza, An Analysis of Automated Code Inspection Tools for PHP Available on Github Marketplace, Sep. 2021, pp. 10-17 (Year: 2021).

Khatri et al, "Validation of Patient Headache Care Education System (PHCES) Using a Software Reuse Reference Model", Journal of System Architecture, pp. 157-162 (Year: 2001).

Lotter et al, "Code Reuse in Stack Overflow and Popular Open Source Java Projects", IEEE, pp. 141-150 (Year: 2018).

Rothenberger et al., "Strategies for Software Reuse: A Principal Component Analysis of Reuse Practices", IEEE, pp. 825-837 (Year:2003).

Tung et al, "A Framework of Code Reuse in Open Source Software", ACM, pp. 1-6 (Year: 2014).

M. Squire, "Should We Move to Stack Overflow?" Measuring the Utility of Social Media for Developer Support, 2015 IEEE/ACM 37th IEEE International Conference on Software Engineering, Florence, Italy, 2015, pp. 219-228, doi: 10.1109/ICSE.2015.150. (Year: 2015).

(56) References Cited

OTHER PUBLICATIONS

S. Bayati, D. Parson, T. Sujsnjak and M. Heidary, "Big data analytics on large-scale socio-technical software engineering archives," 2015 3rd International Conference on Information and Communication Technology (ICoICT), Nusa Dua, Bali, Indonesia, 2015, pp. 65-69, doi: 10.1109/ICoICT.2015.7231398. (Year: 2015).

* cited by examiner

METHODS AND SYSTEMS FOR AUTOMATED SOFTWARE NATURAL LANGUAGE DOCUMENTATION

CROSS-REFERENCE TO RELATED PATENT APPLICATION

This application claims the benefit of and priority to U.S. Provisional Patent Application No. 63/150,395 filed Feb. 17, 2021, the entire disclosure of which is incorporated by reference herein.

TECHNICAL FIELD

The present disclosure generally relates to methods and systems for automated software natural language documentation that is optimized by machine learning.

BACKGROUND

Software documentation is incomplete in most cases, insufficient, lacks continuity and consistency. It is less accurate and inefficient to trace the various levels and versions of the specified functionality. This creates a strong need for automatic conversion of software code to documentation. Other issues include missing documentation, documentation without an objective and infrequent update making the document obsolete. In some cases, there is difficulty in tracing the document to its source code thereby leading to lack of synchronization between model and source code. Even if there is documentation available, there is a threat of the lack of tool support making software artifacts evolve independently and become inconsistent over time, Unified Modeling Language (UML) and architecture specification diagrams being rarely updated. This makes it difficult for engineers since they cannot understand the issue because of insufficient documentation or gathering of wrong information based on outdated documents. Lack of documentation results in critical systems failure resulting in business outages and losses, engineer productivity loss and costs associated.

Poor documentation is a source of ambiguity and uncertainties. Such documentation is obsolete and incomplete, expensive to maintain, and engineers find it difficult to maintain documents due to time pressures in the software industry. The important reason behind defects in the development and maintenance phases are the lack of complete and consistent documents that are up to date. Writing documentation is often expensive and time consuming, by which means the cost of documentation may outstrip its value. Documentation is mostly prepared by people with no technical documentation experience or do not have technical depth of the program. Documentation is hard to read, too dry and terse, vague, not clear, and incomplete. It assumes knowledge that readers do not possess. Often, documentation is misleading and outdated. Documentation is sometimes unavailable owing to the difficulty in maintaining it. These and several other challenges prevent developers and architects from creating useful documentation.

Automatic creation of natural language documentation is lacking in existing techniques seen today. Moreover, existing techniques for automatic Natural Language Generation (NLG) use information retrieval-based approaches on one hand that derive the natural language clues from source code, compute and rank the similarity scores between them and the source code/natural language queries for recommending comments, which is often inefficient and provides poor accuracy with respect to Bilingual Evaluation Understudy (BLEU) measures. Disadvantages such as duplication in summary sentences, incomplete analysis of conceptual entities, non-consideration of semantic aspects such as synonymy and polysemy, and lack of semantic and syntactic analysis of source text. In addition, inaccurate extraction to limited sentences, low coverage, poor coherence, redundancy are other related issues for poor performance of IR based systems.

A Non-Patent Literature (NPL) document titled "A Neural Model for Generating Natural Language Summaries of Program Subroutines" by Alexander LeClair, Siyuan Jiang, and Collin McMillan (Dept. of Computer Science and Engineering University of Notre Dame; Notre Dame, Ind., USA, on 5 Feb. 2019), discloses a neural model for summarizing subroutines. The document provides a model which combines two types of information about source code: 1) a word representation treating code as text, and 2) an abstract syntax tree (AST) representation. However, this NPL document is silent on usage of mainly the programming language specification for generating accurate documentation in line with the actual code statements present in the code. Furthermore, this disclosure is also silent regarding usage of enriched training data with generated replacements for code and text segments to remove bias of the key words present in the code.

United States Patent Application Publication No. 2018/0067836A1, titled "Techniques for Automatically Generating Documentation for Computer Programs," by Jacob Harris Apkon, Arjun Narayanaswamy, and Abdul Qadir, filed on Sep. 5, 2017, and published on Mar. 8, 2018, discloses a system for generating documentation for a computer program. The system teaches performing of a process for generating documentation for a computer program. The process includes accessing source code of a computer program comprising multiple software modules, analyzing the source code of the computer program at least in part by identifying at least one relationship between two or more software modules of the plurality of software modules, obtaining documentation for the computer program using the at least one relationship between two or more software modules of the plurality of software modules, and outputting the documentation. However, this disclosure is using the comments within the code to extract text and using a sentence template to convert code to text which is different from our approach. The '836 publication does not describe any natural language-based machine learning technique to learn documentation from the programming language specifications and learn function documentation of existing programs, where this learning can be used along with enriched summarization techniques to generate the documentation.

International Patent Application Publication No. WO2007/013418A1 titled "System for Writing Software Documentation in Natural Languages," by Satoshi Hirano, Takeshi Ohkawa, and Runtao Qu, filed on Jul. 28, 2005, and published on Feb. 1, 2007, discloses a system for writing a software documentation in natural languages, where input means of the system receives a source file that contains source code sentences written in a programming language, comments attached to the source code sentences and in which a comment explaining a function of one of the source codes is written in natural languages and a code composed of a combination of a code explaining a function and a code indicating the kind of a natural language is added. The source file is interpreted, the code of the combination is identified, and the comment associated with the source code sentence is stored in a memory. Only the comment to which a code corresponding to the kind of the natural language specified by the user is attached and which is to be outputted is extracted, and a software documentation written in a natural language and to be outputted for the source code sentence according to the extracted comment is outputted. However, WO2007/013418A1 does not describe natural language learnings from the programming language specifications without any code comments or translations.

U.S. Pat. No. 9,015,730B1 titled "Natural language Access to Application Programming Interfaces" by Corville O. Allen, Adrian X. Rodriquez, Richard A. Salmon, and Eric Woods; filed on Dec. 17, 2013, and granted on Apr. 21, 2015, discloses a method and process that allow use of natural language queries (NLQs) as a highly unstructured interface to access highly structured application programming interfaces (APIs). To "understand" a user's intent expressed in a natural language query (NLQ), Natural Language analysis (or processing or parsing) (NLP) can be employed. The '730 patent provides that the NLQ/API resolving system "learns" the service provider's API documentation, such that each API endpoint is documented in natural language and has a defined set of required and optional API elements, such as an HTTP signature. The system then receives unstructured requests from clients. The system maps client's unstructured requests to natural language descriptions of API operations in the API's documentation. This disclosure is about extracting a natural query's components to map to a make a structured API call. However, this disclosure does not create documentation with machine learning models trained with multiple programming language specification to understand program statements to generate documentation.

Additionally, U.S. Pat. No. 7,958,493B2 titled "Type Inference System and Method" by Kevin Edward Lindsey, Paul Colton, Robin Sean Debreuil, and Donald Arthur Washburn, filed on Jan. 9, 2007, and granted on Jun. 7, 2011, discloses systems and methods of representing and extracting type information from typeless and dynamically typed programming languages are provided. These systems and methods can be immune to source file edits and the order in which those edits are executed. Deriving type information from these languages allows tools to perform operations, for example, refactoring, intelligence, recognition of semantic errors, etc. These systems and methods can be implemented using processes that, implicitly or explicitly, gather type information for the program, and can also accept user input as well. However, the '493 patent does not teach creation of documentation using natural language processing, programming language specification knowledge, or open-source training using machine learning (ML) methods that include functional preprocessing and syntax detection.

However, the documents and the conventional techniques existed at the time of this invention does not teach creation of documentation using at least two disparate knowledge sources, programming language specification knowledge, and machine learning from open-source projects source code. The existing techniques use only the comments, text in the code and AST tree. Further, the documents discussed above, do not use any summarizing technique to provide a consolidated documentation of the functionality.

Therefore, to overcome the above-mentioned disadvantages, there is a need for a method and a system to generate a comprehensive natural language documentation, which is focused on generation of a meaningful documentation based on natural language generation utilizing machine learning.

SUMMARY

The present disclosure provides techniques that use both programming language specification knowledge and open-source code knowledge to enrich the overall quality of generated documentation. The systems and methods described herein create machine learnt models trained with language syntax rules, program statement documentation that are based on the core programming knowledge. In addition to these, the solution described herein also makes use of the open-source programs and their provided documentation with advanced summarization techniques to extract curated content to train the ML models.

To achieve automatic generation of documents, the present invention uses a Source Code Processor, Documentation Generator, Model Builder, Natural Language (NL) Program Statement Service, NL Function Documentation Service, Documentation Processing Service, Code Processing Service, NL Summarizer Service, which are a unique set of components to perform the task of automatically generating the code documentation given the code base that is not present in any existing solution currently.

The system and method associated with the system that is disclosed here addresses the above-mentioned need for a method and a system to generate a comprehensive natural language documentation, which is focused on generation of a meaningful documentation based on natural language generation. The system comprises a Web GUI Portal, API Hub, Messaging Bus, Request Processor, Source Code Processor, Documentation Generator, ML Model Builder, Data Service, NL Program Statement Service, NL Summarizer Service, NL Function Documentation Service, Code Processing Service, Documentation Processing Service, Database, and File Storage.

The Web GUI Portal is a web application which provides a user interface can be accessed on a browser on a user's computer system. The portal provides web forms for the user to submit requests to generated documentation for a project and view results of the generated documentation for the submitted projects once the generation process is completed.

The API Hub is a service gateway providing services for the web-based portal to interface with the system. The services provide the functionality to map the user request form details to the service to submit the request details to the system for processing to fulfill the request.

The Messaging Bus is a system component to enable event driven architecture for taking the user request, processing it in an asynchronous manner. The user request details are captured by the service and put as a request message in the messaging bus system. Message listeners are configured to listen to incoming messages in the messaging system which will read the details of the message and pass it to the request processor system to further execute the process. Once the execution is completed, the results will also be put in the same messaging system and results listener will update the database on the completion status and results.

The Request Processor is a workflow system which takes the request and executes all the individual tasks that are required to generate the documentation. It is responsible to call the individual task services in the configured sequence. It will provide inputs to each task service and get the result from it to pass to the next task service.

The Source Code Processor component will connect to the project repository and download the project source files to the file storage.

The Source Code Processor will then call the Code Processing Service. The Code Processing Service detects the programming language and the syntax. It decomposes a source code block into a program statement call list having multiple functions. The functions are then processed for building a syntax tree.

The Documentation Generator component is responsible for taking the processed source code and then generating the natural documentation for the code. It internally calls the NL Program Statement Service, NL Function Documentation Service, NL Summarizer Service, and Documentation Processing Service. It gets the results from the individual tasks and consolidates the results by validation checks to ensure consistency in the documentation.

The ML Model Builder component creates the neural network model for Programming Language Neural Network Model and Function Documentation Neural Network Model. It uses the data services to create the training data for training these models. These models are used to generate the documentation for a program statement line of code and to predict the documentation for a given function code snippet.

The NL Program Statement Service generates a plurality of program statement documentation based on the syntax tree and generates the program statement documentation for the different associated operations, for each function associated with the program statement call list. This is done by employing the programming language specification trained ML model and the program statement to generate the documentation for those program statements.

The NL Function Documentation Service generates documentation for the given entire function code. It uses the trained machine learnt model on the open-source code base to generate this documentation.

The NL Summarizer Service is primarily used to summarize multiple documentation text generated into reduced abstract summary providing a crisper documentation. The NL Summarizer Service also incorporates configuration rules specific to software domain documents and code.

The Documentation Processing Service creates the overall documentation at the source file level. It combines the two types of the function documentation created by using the two services namely the NL Program Statement Service and the NL Function Documentation Service. Different rules are applied while enriching the function documentation while combining the two types of the generated documentation. The rules can include the factors of the generated documentation confidence score, similarity between the two types of generated documentation, ratio of generated text to program statement lines of code in the function and program statement type. The program statement types can include declaration statements, expression statements, call statements, control flow statements and i/o statements. Based on all these attributes of the program statement, the summaries are consolidated at a function level. Different set of processing rules are considered while aggregating the functions level documentations to the source file level.

Implementations of the subject matter described in this specification can be implemented to realize one or more of the following advantages. The above disclosed system and method creates documentation by using the two knowledge sources such as programming language specification knowledge and open-source code trained model to provide reliable and accurate documentation by using the machine learning techniques. It also applies multiple ranking mechanisms on the summarization to intelligently consolidate the generated statements at function level and the source file level. Therefore, there is no need to do runtime information gathering and advocating some templates to achieve the desired result.

One implementation of the present disclosure is a system for automatically generating natural language documentation for source code files. The system includes one or more processors and memory storing instructions that, when executed by the one or more processors, cause the one or more processors to perform operations. The operations include parsing a source code file to extract a function and generate an abstract syntax tree, generating first natural language documentation for each of a plurality of program statements within the function using a programming language neural network model, generating second natural language documentation for the function as a whole by processing a code snippet of the function using a function documentation neural network model, consolidating the first natural language documentation and the second natural language documentation at a function level, a source file level, and a project level to create consolidated natural language documentation, and summarizing multiple sentences of the consolidated natural language documentation into an abstract summary of the source code file by applying a set of rules.

In some embodiments, the operations include accepting a remote location of the source code file via a web GUI portal that allows a user to upload a zip file containing the source code file.

In some embodiments, the operations include connecting to a code repository, searching the code repository for the source code file, downloading the source code file from the code repository to organized folder locations for each repository identifier, and maintaining status information to enable pausing and resuming the downloading based on network conditions.

In some embodiments, parsing the source code file to extract the function and generate the abstract syntax tree includes detecting a programming language and syntax of the source code file, parsing the source code file to extract the code snippet of the function from the source code file, generating an abstract syntax tree and a parse tree along with the code snippet of the function, and clean the code snippet of the function to remove non-executable content comprising one or more comments.

In some embodiments, the operations include building the programming language neural network model by extracting data by reading language specifications and reference documentation, preparing training data comprising key constructs of a programming language comprising at least one of syntax expression, functions, function signatures, programming language key words, and associated documentation, encoding the training data for training the programming language neural network model using a machine learning algorithm, and building the programming language neural network model using the training data and saving the programming language neural network model to file storage.

In some embodiments, the operations include building the function documentation neural network model by extracting functions and associated documentation from a set of training source code files, evaluating the functions and the associated documentation relative to predetermined quality thresholds comprising at least one of a number of sentences, semantic quality of the documentation, and a date at which a corresponding training source code file was most recently updated, creating training data comprising multiple representations of source code of the training source code files by substituting variable names with auto-generated synthetic names, encoding the training data for training the function documentation neural network model using a the machine learning algorithm, and building the function documentation neural network model and saving the function documentation neural network model to file storage.

In some embodiments, generating the first natural language documentation for each of the plurality of program statements within the function includes digesting the abstract syntax tree and deciphering a type of each program statement, operands, operators, and native functions in the program statement and predicting overall documentation for the program statement using the programming language neural network model.

In some embodiments, generating the second natural language documentation for the function as a whole includes digesting the abstract syntax tree and extracting the code snippet of the function, encoding the code snippet of the function, retrieving matching snippet documentation from a trained knowledgebase using the function documentation neural network model, and ranking the matching snippet documentation for the code snippet of the function based on quality rules to select a top recommendation.

In some embodiments, consolidating the first natural language documentation and the second natural language documentation includes comparing the first natural language documentation and the second natural language documentation using corresponding confidence scores and a similarity between the first natural language documentation and the second natural language documentation, calculating a ratio of generated text to program statement lines of code in the function and program statement type, wherein the program statement type comprises at least one of declaration statements, expression statements, call statements, control flow statements, and input-output (i/o) statements, and consolidating the first natural language documentation and the second natural language documentation by applying rules that are based on attributes of the program statements and function metrics.

In some embodiments, summarizing the multiple sentences of the consolidated natural language documentation into the abstract summary of the source code file includes extracting meaningful sentences from a given paragraph by evaluating their structure, subject and context using NLP techniques, and encoding the meaningful sentences and summarizing the meaningful sentences using a summarizer machine learning model.

In some embodiments, the operations include refining the consolidated natural language documentation by assessing parameters of the consolidated natural language documentation using rules and natural language processing techniques, the parameters comprising at least one of semantic coherence, clarity, and conciseness.

Another implementation of the present disclosure is a method for automatically generating natural language documentation for source code files. The method includes parsing a source code file to extract a function and generate an abstract syntax tree, generating first natural language documentation for each of a plurality of program statements within the function using a programming language neural network model, generating second natural language documentation for the function as a whole by processing a code snippet of the function using a function documentation neural network model, consolidating the first natural language documentation and the second natural language documentation at a function level, a source file level, and a project level to create consolidated natural language documentation, and summarizing the consolidated natural language documentation using a customized summarization routine.

In some embodiments, the method includes generating a function signature for each of the plurality of program statements within the function using a technical signature parser for creating the abstract syntax tree.

In some embodiments, the method includes training the programming language neural network model on a plurality of key constructs of a programming language comprising at least two of syntax expression, functions, function signatures, programming language key words and associated documentation and translating each source code statement to create the first natural language documentation.

In some embodiments, the method includes training the function documentation neural network model using a set of training source code files and associated documentation. The training may include parsing logic based on a language of the training source code files, evaluating a function of the training source code files and the associated documentation relative to predetermined quality standards comprising at least one of a number of lines of code in the function, a number and type of arguments to the function, a number of lines of documentation for the function, semantic quality of provided documentation for the function, a date at which a corresponding training source code file was most recently updated, and code complexity scores, synthesizing the associated documentation by paraphrasing and replacing variable names within the function to reduce bias in predictions of the function documentation neural network model, and encoding training data and executing a machine learning algorithm to train the function documentation neural network model.

In some embodiments, the method includes using the programming language neural network model to generate natural language documentation for each program statement in the function, consolidating the first natural language documentation and the second natural language documentation at the function level by assessing the natural language documentation for each program statement in the function, and extracting the code snippet of the function from the abstract syntax tree for use in processing the code snippet of the function using the function documentation neural network model.

In some embodiments, summarizing the consolidated natural language documentation includes generating recommendations for summarization of candidates based on at least one of a confidence score of the first natural language documentation and the second natural language documentation, a similarity between the first natural language documentation and the second natural language documentation, and a ratio of generated text to program statement lines of code in the function and program statement type, identifying significant functions in the source code file using a call graph that indicates bidirectional dependencies of the function, calculating code level metrics comprising at least one of complexity, publicly accessible functions, internal function dependency metrics, and a number and type of operations within the function, and executing a ranking algorithm to rank the function based on the code level metrics.

In some embodiments, the method includes refining the consolidated natural language documentation by evaluating a quality of the consolidated natural language documentation by evaluating factors comprising at least one of an extent of subject covered in the consolidated natural language documentation, semantic repetition, functional flow, and grammar and refining the consolidated natural language documentation by correcting the grammar and flow to generate a clean documentation.

Another implementation of the present disclosure is a computer program product for automatically generating natural language documentation for source code files. The computer program product includes a processor and memory storing instructions thereon. The instructions, when executed by the processor, cause the processor to parse a source code file to identify an executable function within the source code file and a plurality of program statement lines of code within the executable function, generate first natural language documentation for each of the plurality of program statement lines of code using a programming language specification trained neural network model, aggregate the first natural language documentation for each of the plurality of program statement lines of code to generate an aggregated natural language documentation for the function, independent of the aggregated natural language documentation, generate a second natural language documentation for the function based on a code snippet of the function as a whole using a source code documentation trained neural network model, and combine the aggregated natural language documentation and the second natural language documentation to generate a combined natural language software documentation.

In some embodiments, the instructions cause the processor to summarize and refine the combined software documentation by applying a predetermined set of summarization rules to generate a refined natural language software documentation and at least one of store the refined natural language software documentation as a software documentation file or display the refined natural language software documentation to a user.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
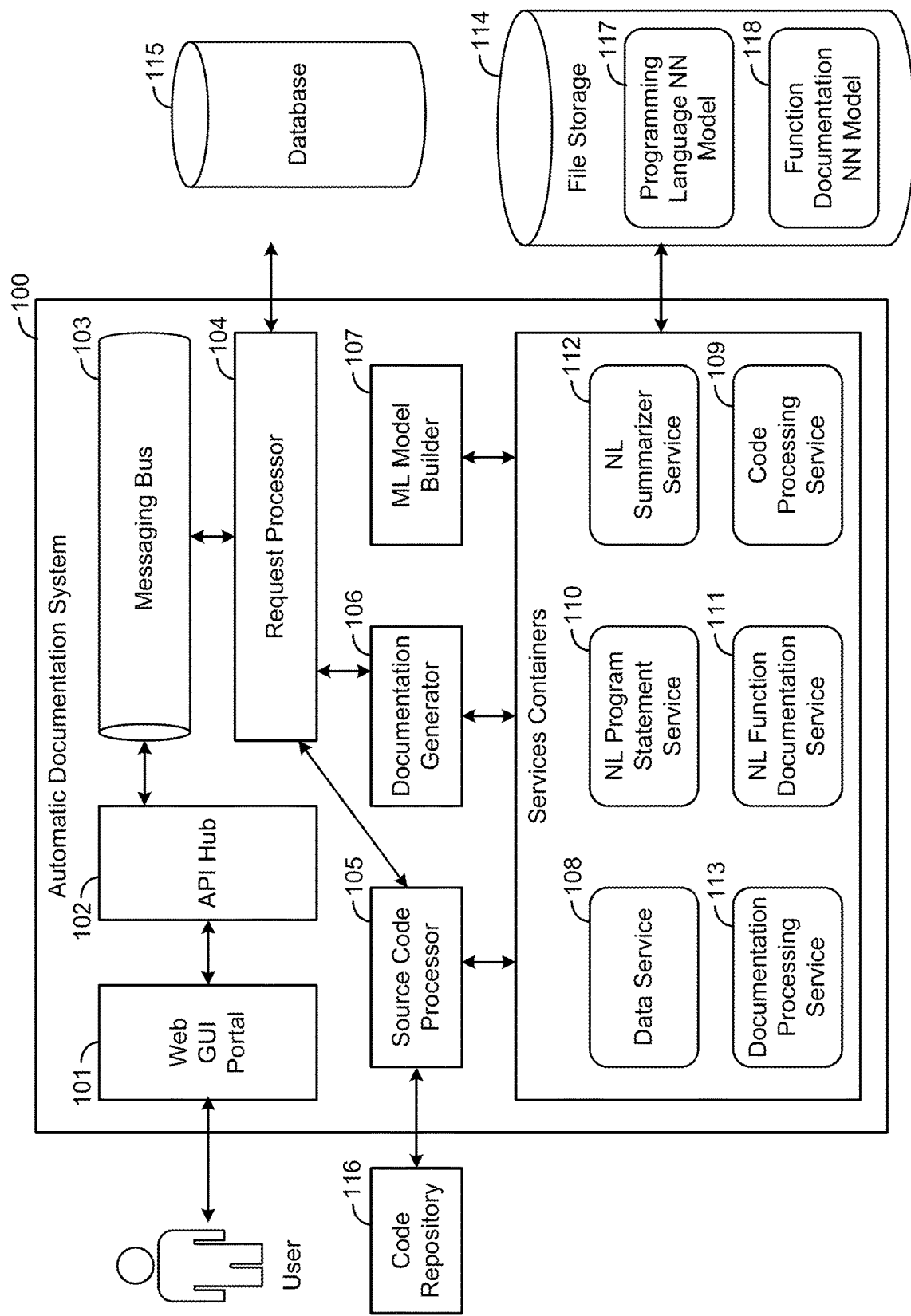
FIG. 1 shows a system architecture that performs automatic documentation, according to some embodiments.

FIG. 1 shows a system 100 or a high-level architecture that performs automatic documentation. Briefly, and as described in further detail below, the system 100 is shown to include a Web GUI Portal 101, API Hub 102, Messaging Bus 103, Request Processor 104, Source Code Processor 105, Documentation Generator 106, ML Model Builder 107, Data Service 108, Code Processing Service 109, NL Program Statement Service 110, NL Function Documentation Service 111, NL Summarizer Service 112, Documentation Processing Service 113, File Storage 114 and Database 115 which are a unique set of components to perform the task of automatically generating the code documentation given the code base. In the embodiment shown in FIG. 1, the system 100 is shown to include the Web GUI Portal 101 which has a User Interface form for a user to interface with the system 100 for submitting different requests and viewing their status. The Web GUI Portal 101 allows the user to submit requests for generating the natural language documentation for one or more projects and viewing the generated results. For submitting a new request, user is presented with a form to provide the project name and its source code location details. After entering these details, the system 100 validates the provided information and presents option to submit the request. After submitting the request for generating documentation, the system 100 sends an email notification when the request is completed processing. The user can access the results from the status screen. In an embodiment, the Web GUI Portal 101 accepts a remote location of source files and allows a user to upload a zip file containing the source file.

The submitted request from web portal goes to the API Hub 102 which acts as a gateway for accepting all web service requests from the GUI Portal 101. The API Hub 102 hosts the web services for taking the requests and creating request messages to be put into the Messaging Bus 103. The Messaging Bus 103 provides for event driven architecture, thereby enabling long running processes to be decoupled from requesting calls from the system 100. This decoupling helps the system 100 to service the request and notify user once the entire process of generating the documentation is completed. In some embodiments, system 100 may include job listeners configured to listen to the messages in the Messaging Bus 103. Different type of messages triggers different jobs. The different sub-tasks generating the documentation and creating the machine learnt models for natural language documentation put different messages into the Messaging Bus 103 and listen for other messages to trigger respective tasks. The Request Processor 104 acts as a workflow system which sequences the different activities required from reading source code, processing source code to generating the natural documentation by applying the machine learning models. The Request Processor 104 has the logic to sequence the tasks and address any exception scenarios while the tasks are processing the different steps for the request.

The Source Code Processor 105 is the first task triggered by the Request Processor 104. The Source Code Processor 105 takes the details of project source code location and connects to the repository location, shown as Code Repository 116. The Source Code Processor 105 then downloads the project code to the file storage. The Source Code Processor 105 has capability to pause the downloads and restart in event of any system issue or connectivity issue. In other words, the Source Code Processor 105 connects to the Code Repository 116 and searches for the source files and downloads the source files to organized folder locations for each repository identifier. This is performed while maintaining status of the download to pause and continue based on the network conditions.

The downloaded source code goes as an input to the Code Processing Service 109. The Code Processing Service 109 reads the source file and detects the programming language and the syntax. After detecting the language, the Code Processing Service 109 uses the appropriate parser to parse the source file to extract the functions code snippets from the source file. The Code Processing Service 109 also generates the abstract syntax tree and parse tree along with the function code snippet using a parser loaded with the programming language syntax rules. The function signature is extracted and stored along with the function code snippet and the abstract syntax tree. The Code Processing Service 109 also cleans up the code snippet to remove comments and other non-executable content.

Once the map of function signature, function code snippet, and the abstract syntax tree is created, the Documentation Generator 106 is triggered. The Documentation Generator 106 uses the function code snippet and the abstract syntax tree to generate the documentations using the natural language machine learning services. The Documentation Generator 106 mainly uses the Documentation Processing Service's 113 output to get a consolidated documentation. The Documentation Generator 106 therefore, consolidates documentations from the statement line of code documentation at the function level, source file level and project level by applying ranking methodologies to select critical documentation elements. This consolidated documentation is checked against set quality parameters. These quality parameters may be used to assess the generated documentation's different attributes on clarity, consistency, and conciseness to refine the documentation. Therefore, the Documentation Generator 106 refines the overall project documentation by auto-fixing documentations for improved quality.

The Documentation Processing Service 113 receives source file details, its function and abstract syntax tree map which is used to generate the natural documentation from the two ML services. The Documentation Processing Service 113 merges the documentation produced by the neural network models 117-118 to create functions documentation. The Documentation Processing Service 113 takes the function code snippets and the abstract syntax tree and creates each program statement line of code from the AST. The Documentation Processing service 113 feeds this individual program statement line of code to the NL Program Statement Service 110 to generate the documentation for the each of the program statement line of code via a natural language neural network trained model. The Documentation Processing Service 113 collects the documentations for each program statement line of code in a function. Each program statement line of code is given a score based on its attributes and operations done. Some example attributes are operations done directly on function arguments, application of business rules, temporary calculations etc. Based on the individual scores for each program statement line of code, the Documentation Processing Service 113 determines a final summary for all the consolidated documentations for the program statement lines of code in a function. The Documentation Processing Service 113 generates a function documentation using the NL Function Documentation Service 111. The entire code snippet within a function is sent to the NL Function Documentation Service 111 which provides the generated documentation for the function by using the machine learnt model. The NL Program Statement Service 111 also digests the abstract syntax tree and deciphers the type of statement, operands, operators, and native functions in the statement. Then the NL Program Statement Service 111 predicts the overall documentation for the statement using trained neural network model, or the NL Program Statement Service 111 predicts function documentation on a function code snippet via a neural network model. Furthermore, the NL Program Statement Service 111 digests the abstract syntax tree and extracts the function code snippet, encodes the code snippets, retrieves matching snippet documentation from trained knowledgebase which was trained by the ML Model Builder 107, and ranks the snippets and documentation based on quality rules to select the top recommendation.

This NL function documentation is used along with the earlier summarized documentation from the program statement lines of code in a function to create an enriched documentation for the given function. The Documentation Processing Service 113 compares the sentences within the two types of documentation and evaluates semantic similarity to identify unique sentences. The Documentation Processing service 113 creates an enriched documentation by fusing both the generated documentations for function-based and statement-based by ranking the documentations and program statement line of code for aggregation rules. The Documentation Processing Service 113 also considers the generated documentations confidence scores as a factor while merging these two types of documentations for creating the enriched documentation for the given function. Once each function enriched documentation is created, the Documentation Processing Service 113 proceeds to prepare the source file level documentation. The source file level documentation is an abstract summary of the documentations of the individual functions in the source file. To create this abstract summary, along with the function level documentations, the function level significance metrics are used. The Documentation Processing Service 113 uses the AST to create the call graph. The parent function nodes are the ones which are calling the other functions which are called as child function nodes. The parent function nodes are given higher scores for increased weightage to reflect in their contribution to the source file level functional summary. The function's code level metrics are another parameter which provides the weightage to the contribution to the source file level functional summary. The code level metrics may include the number of lines of code in the function, code complexity, number and type of entities referred in the code, number of business rules etc. Based on these function metrics, significant functions are detected, and their documentations are consolidated in the sequence based on the call graph. This consolidated function documentations are summarized using the NL Summarizer Service 112. The summarization process makes use of the above-mentioned metrics to create the relevant abstract summary at the source file level.

The ML Model Builder 107 is responsible for building the machine learnt models including the Programming Language Neural Network Model 117 and Function Documentation Neural Network Model 118. The Programming Language Neural Network Model 117 is built using the programming language specification documentation as the base data for training. This machine learning technique can be applied to specification documentation for a variety of programming languages including, for example, Java, JavaScript, Python, PHP, Ruby, C#, etc. The same technique can be applied to other programming languages also. The programming language specification documentation are stored in the File Storage 114. The Data Service 108 reads the programming language specification documentation and parses it to create the training data. The Data Service 108 parses the specification documentation to build the training data comprising key constructs of the programming language, syntax expression, functions, function signatures, programming language key words and their associated documentation. This training data is then fed to the ML Model Builder 107 for creating the vector embeddings for the documentation, syntaxes, and function signatures. The ML Model Builder 107 then encodes the training data for use in training the ML models using a machine learning algorithm. In other words, the vector embedding creation process includes an encoder and decoder for processing the training data for the training. The ML Model Builder 107 builds the Programming Language Neural Network Model 117 and saves the built Programming Language Neural Network Model to the File Storage 114. Hence, the embeddings are saved to the file storage 114. Each of the embedding is tagged against multiple identifiers such as function signature and syntax. The model provides services to match the embeddings of the programming language constructs and parsed program statement line of code constructs.

The ML Model Builder 107 builds the Function Documentation Neural Network Model 118 by using open-source project's source code as the base training data. The ML Model Builder 107 builds neural network models for generating documentation for code statements and predicting documentation for code functions. It uses the Data Service 108 to connect to the Code Repository 116 and download the code to the File Storage 114. The source code files are then processed first by parsing the files content using a function parser to extract the files functions and their documentations provided within the source file. The parsing logic is based on the language of the code being processed. The functions and their documentation are then evaluated for meeting the set quality thresholds before processing them further. The metrics used to evaluate the quality could be number of lines of code in the function, number, and type of arguments to that function, number of lines of documentation for that function, semantic quality of provided documentation for that function, last updated date of the source file, code complexity scores etc. Based on rules defined for thresholds meeting the metrics values, the functions are selected for further processing. The function and its associated documentation are stored as a key value pair where the function is assigned a unique identifier. The function's signature, its arguments are stored as separate metadata. The function's code content is parsed into a parse tree. This parse tree is then used to create multiple representations of the code by substituting variable names with auto-generated randomized names. The associated documentation value is also run through an NLP algorithm to generate different paraphrased documentation. Hence one function and documentation key value pair will be transformed into multiple sets of training data. This procedure is done for the selected list of projects in the Code Repository 116 to create a corpus of enriched training data for the neural network model. This training data is used to train the neural network model to create a model with encoder decoder architecture for using the vectorised embeddings during prediction or generating documentations for a given function code snippet. After the training is done, the Function Documentation Neural Network Model 118 is saved to the File Storage 114.

The NL Program Statement Service 110 provides a natural language documentation for a given line of code. It uses the machine learnt Programming Language Neural Network Model 117 to generate the documentation for a given programming statement line of code. The Programming Language Neural Network Model 117 takes the line of code and uses the earlier trained knowledge on the programming language specification to generate the documentation for it.

The NL Function Documentation Service 111 uses Function Documentation Neural Network Model 118 to generate a natural language documentation for a given function code snippet. The NL Function Documentation Service 111 loads the Function Documentation Neural Network Model 118 from the File Storage 114 and calls the model's function to predict the documentation of the function. Along with the documentation, the NL Function Documentation Service 111 also gets the confidence score for the generated documentation. The NL Summarizer Service 112 is used to provide a meaningful summary from a given paragraph. The NL Summarizer Service 112 is called from the Documentation Processing Service 113. The service uses the model saved in File Storage 114 to generate the abstract summary of the given paragraph. This summarizer service model using the NL Summarizer Service 112 transforms the given paragraph into multiple sentences and uses machine learnt natural language processing techniques to generate the summary. Therefore, the NL Summarizer Service 112 extracts meaningful sentences from a given paragraph by evaluating their structure, subject and context using NLP techniques and encodes the extracted sentences and summarizing the extracted sentences using the machine learnt summarizer model for software domain. The file storage 114 is used to store document type of data, source code files, neural network models etc.

The Database 115 is RDBS database like MySQL to store all meta-data pertaining to the requests received from the user portal, messaging bus, request processor and from other system components described above. The meta-data includes details of every request to identify the user who submitted it, requested project or source code details to track the progress as the system 100 processes the request through its different tasks. The status of each execution step in whole process is stored in this database 115 to track and notify user on completion.

Figure 2:
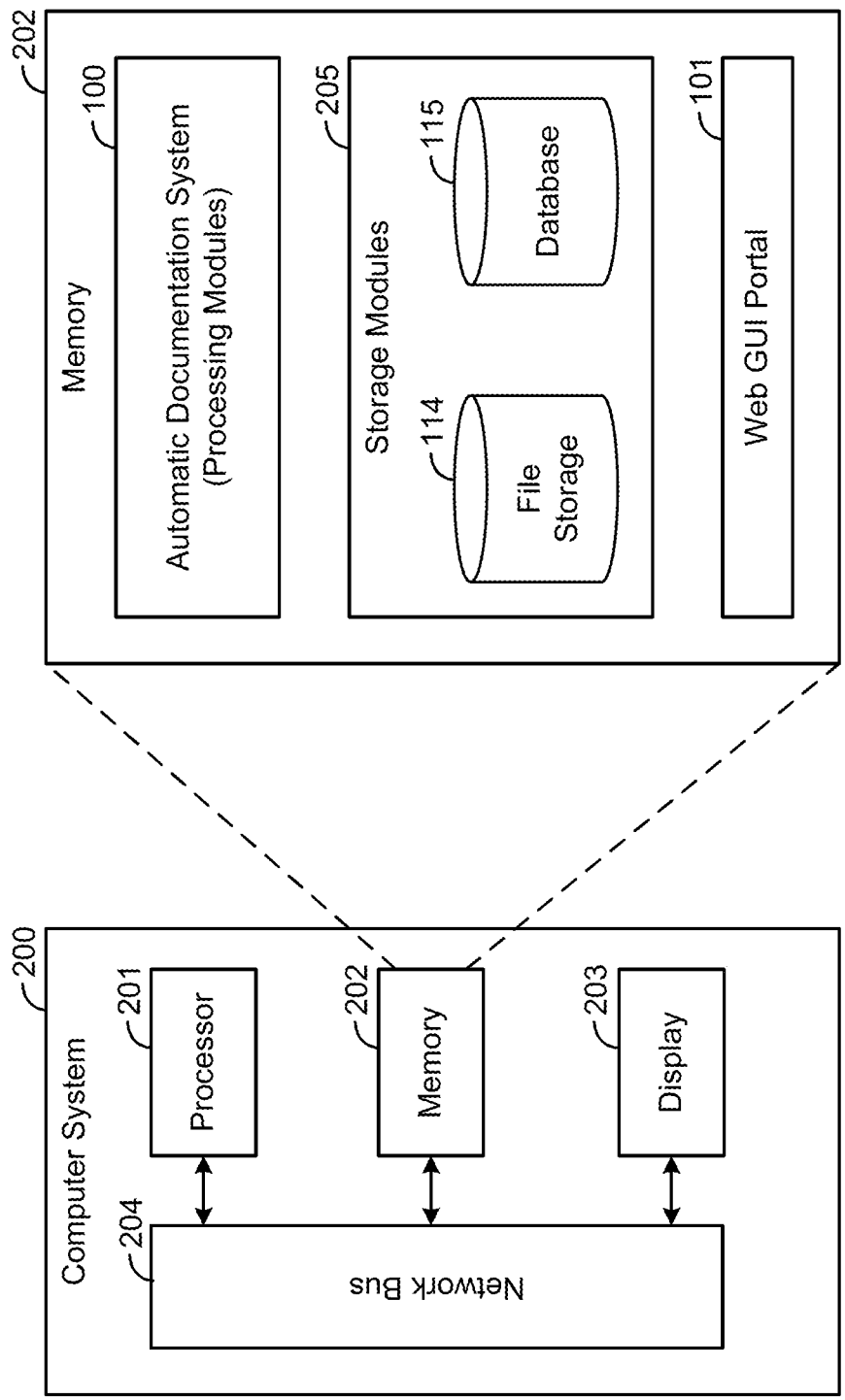
FIG. 2 shows an example computer system implementation for automated software natural language documentation, according to some embodiments.

FIG. 2 shows a block view of the computer system implementation 200 in an embodiment performing automated software natural language documentation. This may include a Processor 201, Memory 202, Display 203, Network Bus 204, and other input/output like a mic, speaker, wireless card etc. The processing modules of the automated software natural language documentation system 100, Storage Modules 205 including File Storage 114, Database 115, and Web GUI Portal 101 are stored in the Memory 202 which provides the necessary machine instructions to the Processor 201 to perform the executions for generating the software natural language documentation. In embodiments, the Processor 201 controls the overall operation of the system and managing the communication between the components through the Network Bus 204. The Memory 202 holds the automated software natural language documentation system code, data, and instructions of the system processing modules 100 and maybe of different types of the non-volatile memory and volatile memory. In some embodiments, the Processor 201 and the Memory 202 form a processing circuit configured to perform the various functions and processes described throughout the present disclosure. The Web GUI Portal 101 may be a component of the system 100 or separate from the system 100 as shown in FIG. 2.

Figure 3:
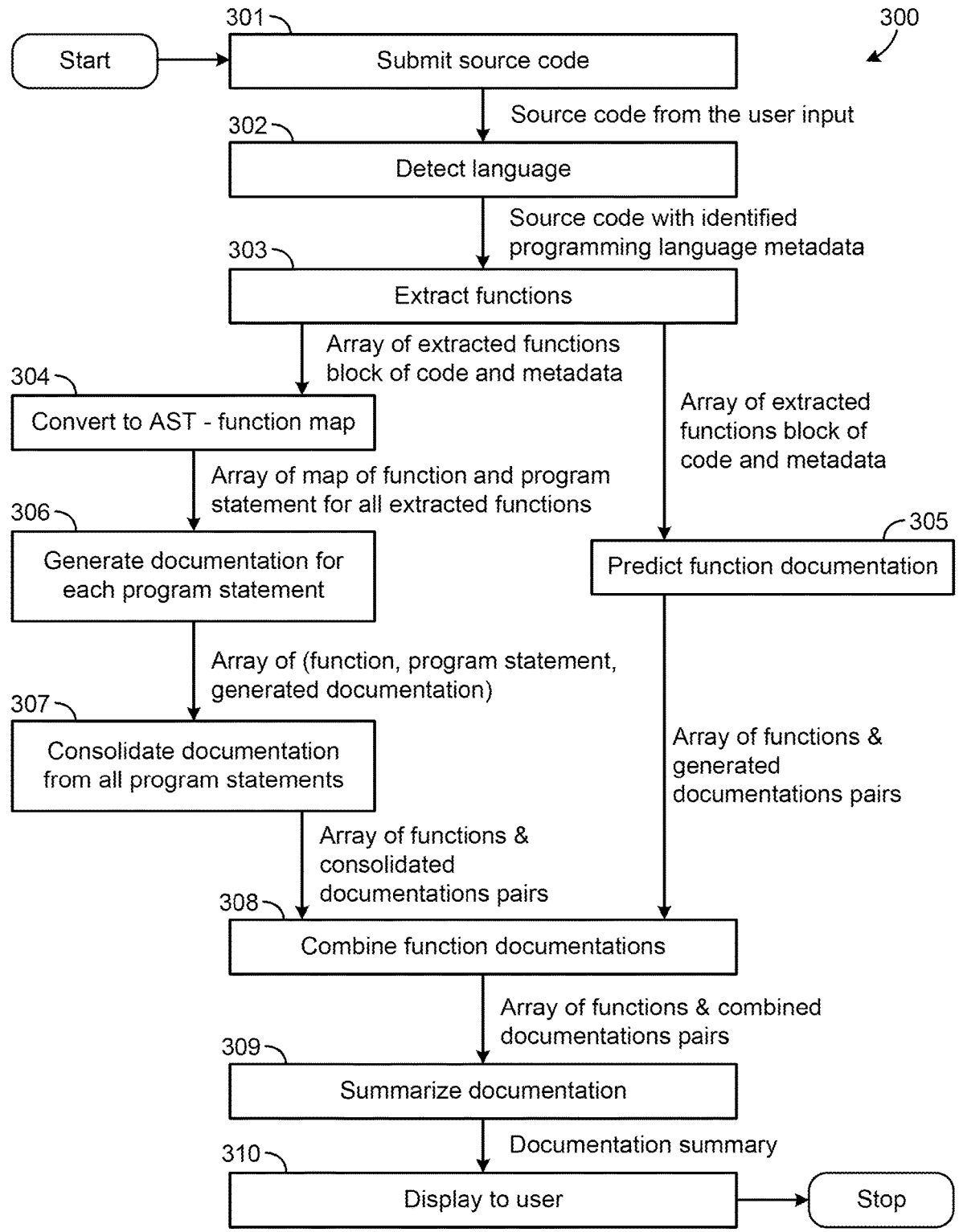
FIG. 3 shows the overall process flow for automatically generating software document, according to some embodiments.

FIG. 3 shows the overall process 300 for generating the natural language documentation. In step 301, the user submits the source code details through the Web GUI Portal 101 for generating the documentation for it. Once the source code details are available the system reads the source code and, in step 302, the programming language of the code is detected to decide the subsequent set of technical components for processing the code further. In step 303, the source code is parsed and the function code snippet is extracted. In some embodiments, step 303 includes extracting the function code snippet from the abstract syntax tree and predicting function documentation on the provided full function code snippet by using the neural network trained model. The output of step 303 may include an array of extracted functions, block of code, and metadata.

Following step 303, process 300 splits into two branches. The first branch (i.e., steps 304, 306, and 307) may be performed by the NL Program Statement Service 110, whereas the second branch (i.e., step 305) may be performed by the NL Function Documentation Service 111. The two branches of process 300 may be executed in parallel, in series, or any other order. In the first branch of process 300, the source code functions are converted to abstract syntax tree in step 304. The function signatures are also extracted in step 304 to produce an array of function maps and program statements for all extracted functions. Then in step 306, documentation is generated for each of the program statement line of code in the function. The output of step 306 may include an array of function, program statement, and generated documentation. Then step 307, documentation is consolidated from all program statements. In other words, all the documentation of individual line of code is consolidated for that function. The output of step 307 may include an array of functions and consolidated documentation pairs. In the second branch of process 300, the whole function snippet code is sent to a machine learnt model to predict function documentation in step 305. The output of step 305 may include an array of functions and generated documentation pairs. Both of the branches of process 300 then provide input to step 308.

In step 308, both the documentation generated from the program statement line of code (i.e., steps 304, 306, and 307) and the other predicted documentation by sending the entire function code (i.e., step 305) are merged based on pre-defined rules to create an enriched documentation for the function. The enriched documentation may include an array of functions and combined documentation pairs. Then in step 309, all the generated enriched documentation is summarized based on priorities set for the functions based on their metrics and other attributes of usage. The list of available documentations is then summarized to reflect a summary of all the functions in the source code file. Therefore, step 309 summarizes the function level documentations and consolidates at source file level documentation using a customized summarization routine. Therefore, the software document is summarized via a summarizer or the NL Summarizer Service 112, where the list of program statement line of code documentation comprises the aggregated statement documents and recommendations for including in the final summary documentation. In step 310, the summarized documentation for the source file is made available to the user on the Web GUI Portal 101 once the generation is completed.

A representative example of a source code which can be submitted in step 301 is shown below:

Example Source Code Submitted in Step 301:

```
package com.abc;
import java.util.ArrayList;
import java.util.List;
public class Account {
    public double interestEarned( ) {
        double amount = sumTransactions( );
```

Example Source Code Submitted in Step 301:
-continued

```
switch(accountType){
    case SAVINGS:
        if (amount <= 1000)
            return amount * 0.001;
        else
            return 1 + (amount-1000) * 0.002;
    case MAXI_SAVINGS:
        if (amount <= 1000)
            return amount * 0.02;
        if (amount <= 2000)
            return 20 + (amount-1000) * 0.05;
        return 70 + (amount-2000) * 0.1;
    default:
        return amount * 0.001;
}
}
```

After passing through the subsequent process steps of detecting the language in step 302 and extracting functions in step 303, the functions extracted are mapped to their corresponding ASTs generated in step 304 and documentation is generated for each program statement in step 306. A representative sample of the documentation generated for each program statement (e.g., a JSON array) in step 306 for the source code sample provided above is shown below:

Example Output of Step 306: JSON Array

```
{
  "programStatements":[
    {
      "functionStatement":"double amount",
      "documentation":"Declare a variable amount with type double"
    },
    {
      "functionStatement":"= sumTransactions ( )",
      "documentation":"Assign a value to the variable"
    },
    {
      "functionStatement":"if (amount <= 1000)",
      "documentation":"Conditional if statement to check a condition"
    },
    {
      "functionStatement":"return amount * 0.001",
      "documentation": "Return a certain value"
    }
  ]
}
```

A representative sample of the array output of step 305 is illustrated below in JSON Array format:

Example Output of Step 305: JSON Array

```
{
  "function_data": [
    {
      "code":"public double interestEarned( ) {\n double amount = sumTransactions( );\n switch(accountType){\n case SAVINGS An if (amount <= 1000)\n return amount * 0.001;\n else\n return 1 + (amount-1000) * 0.002;\n case MAXI_SAVINGS:\n if (amount <= 1000)\n return amount * 0.02;\n if (amount <= 2000)\n return 20 + (amount-1000) * 0.05;\n return 70 + (amount-2000) * 0.1;\n default:\n return amount * 0.001;}\n }",
      "parameters": "( )"
      "language":"java",
      "function_name":"interestEarned",
      "generated_documentation":"Calculate the Interest earned"
    }
  ]
}
```

Figure 4:
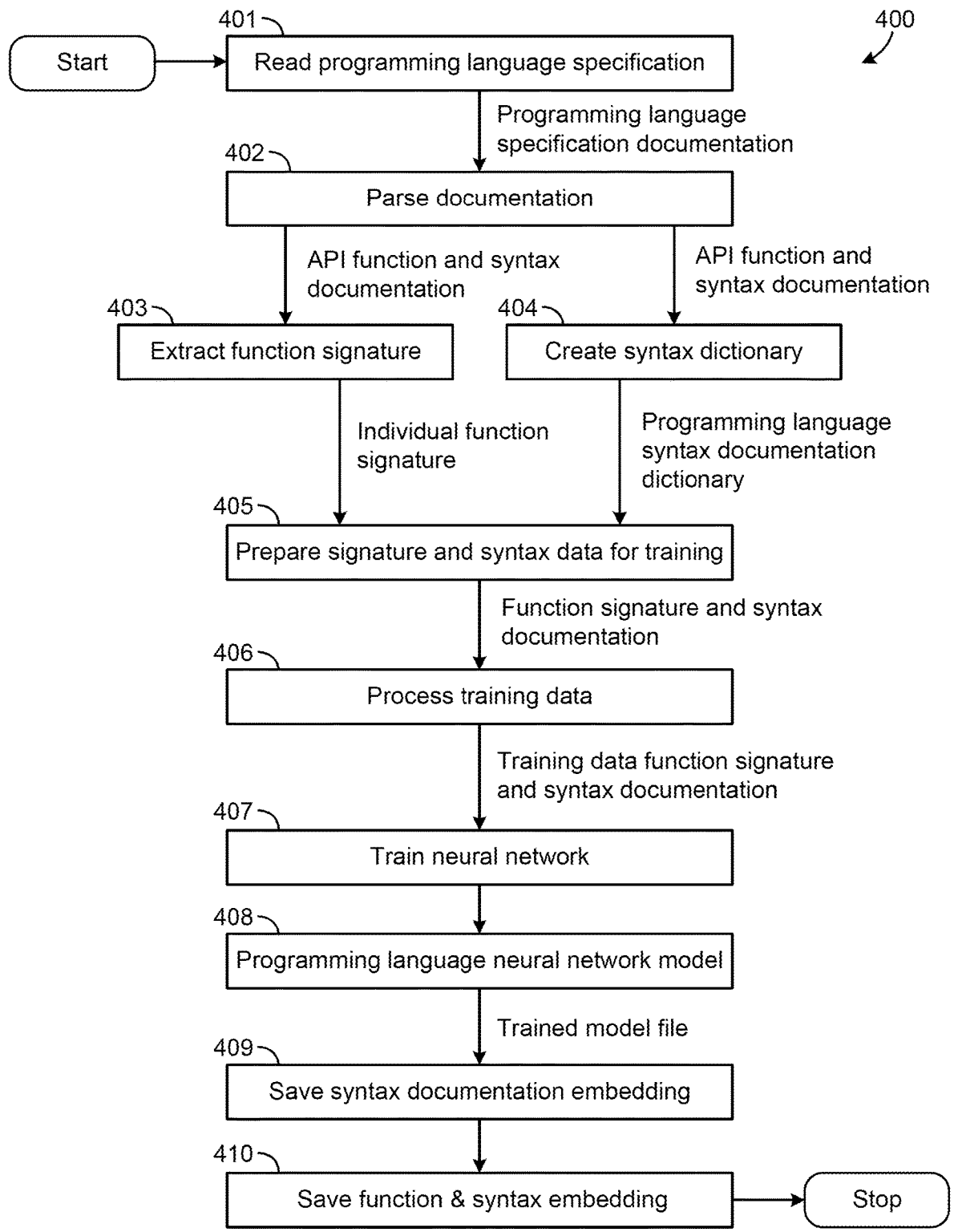
FIG. 4 shows the process of building Programming Language Neural Network Model by using the programming language specification data for training, according to some embodiments.

FIG. 4 shows the high-level process 400 for building the Programming Language Neural Network Model 408 which is used to generate the documentation for a program statement line of code. The Programming Language Neural Network Model 408 may be the same as the Programming Language Neural Network Model 117 described with reference to FIG. 1. In some embodiments, process 400 is performed by the ML Model Builder 107. Every programming language has a specification document detailing out the different constructs and functions of the programming language. The documentation on the syntax dictionary, language key words, and native library functions (i.e., the programming language specification) is first read in step 401. In step 401, the language reference documents for each of programming language loaded into memory by reading the corresponding documentation file. Step 401 involves reading a source code file and determining a programming language using a language detector. Then in step 402, here the source code file is parsed to extract the functions via a function parser with knowledge of the programming language syntax. The documentation data is parsed to extract the critical elements of the programming language knowledge to understand the syntax rules, operators, keywords, statements, import functions, native functions etc. One of the critical elements are the native functions which are used in a program statement line of code. The output of step 402 may include API function and syntax documentation. The API function and syntax documentation generated in step 402 may be used in both step 403 and 404. In some embodiments, steps 403 and 404 are performed in parallel, but could be executed sequentially in other embodiments.

In step 403, function signatures are extracted. The function signatures may include native function details with the signature format, arguments, return values and the associated documentation specifying the purpose of the native function. In some embodiments, step 403 generates a function signature for the program statement line of code associated with the source code block via a technical signature parser for creating the AST. A representative sample of a function signature (e.g., a JSON file) which can be generated in step 403 for source code sample submitted in step 301 is shown below:

Example Function Signature Output of Step 403:

```
{
  "function_data":[
    {
      "code":"public double interestEarned( ) {\n double amount = sumTransactions( );\n switch(accountType){\n case SAVINGS:\n if (amount <= 1000)\n return amount * 0.001;\n else\n return 1 + (amount-1000) * 0.002;\n case MAXI_SAVINGS:\n if (amount <= 1000)\n return amount * 0.02;\n if (amount <= 2000)\n return 20 + (amount-1000) * 0.05;\n return 70 + (amount-2000) * 0.1;\n default:\n return amount * 0.001;}\n }",
      "parameters":"( )"
      "language":"java",
      "docstring": "",
      "function_name":"interestEarned",
      "sha": "b746ac01c9f39de94cac2d56f665285b0b121v974",
      "class_name": "Account",
      "package_name": "com.abc",
      "import_statements": ["java.util.ArrayList","java.util.List"],
      "return_type": "double",
      "return_statement": "return amount * 0.001",
      "generated_documentation":"Calculate the Interest earned"
    }
  ]
}
```

In step 404, a syntax dictionary is created from the earlier parsed specification documentation. In some embodiments, step 404 includes preparing the syntax of the language as a dictionary having the various constructs of the programming language and their associated purpose documentations. The programming language syntax documentation generated in step 404 and the individual function signatures generated in step 403 may be provided as inputs to step 405.

In step 405, signature and syntax data is prepared for training. The syntax dictionary data created in step 404 and the native function data extracted in step 403 are processed to a format to feed into the machine learning algorithm. The output of step 405 may include training data including the function signature and syntax documentation. Next, in step 406, the training data is processed. In some embodiments, the training data is chunked to batches for training, validation and testing the neural network model. The next step is to train the neural network in step 407 which uses the provided training data to train in multiple iterations while using the validation set of data to improve the effectiveness. In step 407, the Programming Language Neural Network Model 408 is trained with the programming language on multiple key constructs of the programming language that include syntax expression, functions, function signatures, programming language key words and their associated documentation, and translating the source code statement line of code to the code documentation. Here, the recommendations for summarization candidates are based on the generated documentation confidence score, similarity between the two types of generated documentation, ratio of generated text to program statement line of code in the function and program statement type.

As an output of training in step 407, the Programming Language Neural Network Model 408 is built and saved. In the next steps, the syntax documentation embedding is saved in step 409 and the function and syntax embedding is saved in step 410. Steps 409 and 410 may include saving the neural network models trained files which are later used for generating the documentation. In an embodiment, significant functions are identified in the source file and in the project by creating the call graph to create the function's bidirectional dependencies. The code level metrics are also calculated, such as, complexity, publicly accessible functions, internal function dependency metrics, number, and type of operations within the function. Then, the ranking algorithm is executed to rank the functions based on the above metrics captured and combine the function level documentations. Examples of the embeddings which can be generated in steps 409 and 410 are shown below:

---
Example Syntax Documentation Embedding from Step 409
---
array([ 0.4805648 , 0.18369392, -0.28554988, ...,
-0.01961522,
1.0207764, -0.67167974], dtype=float32)

---
Example Function and Syntax Embedding from Step 410
---
array([ (0.501246, 0.6742124),
(-0.9712323, -0.0412192),
...
(1.7109014, -0.8913128)], dtype=float32)

---

Figure 5:
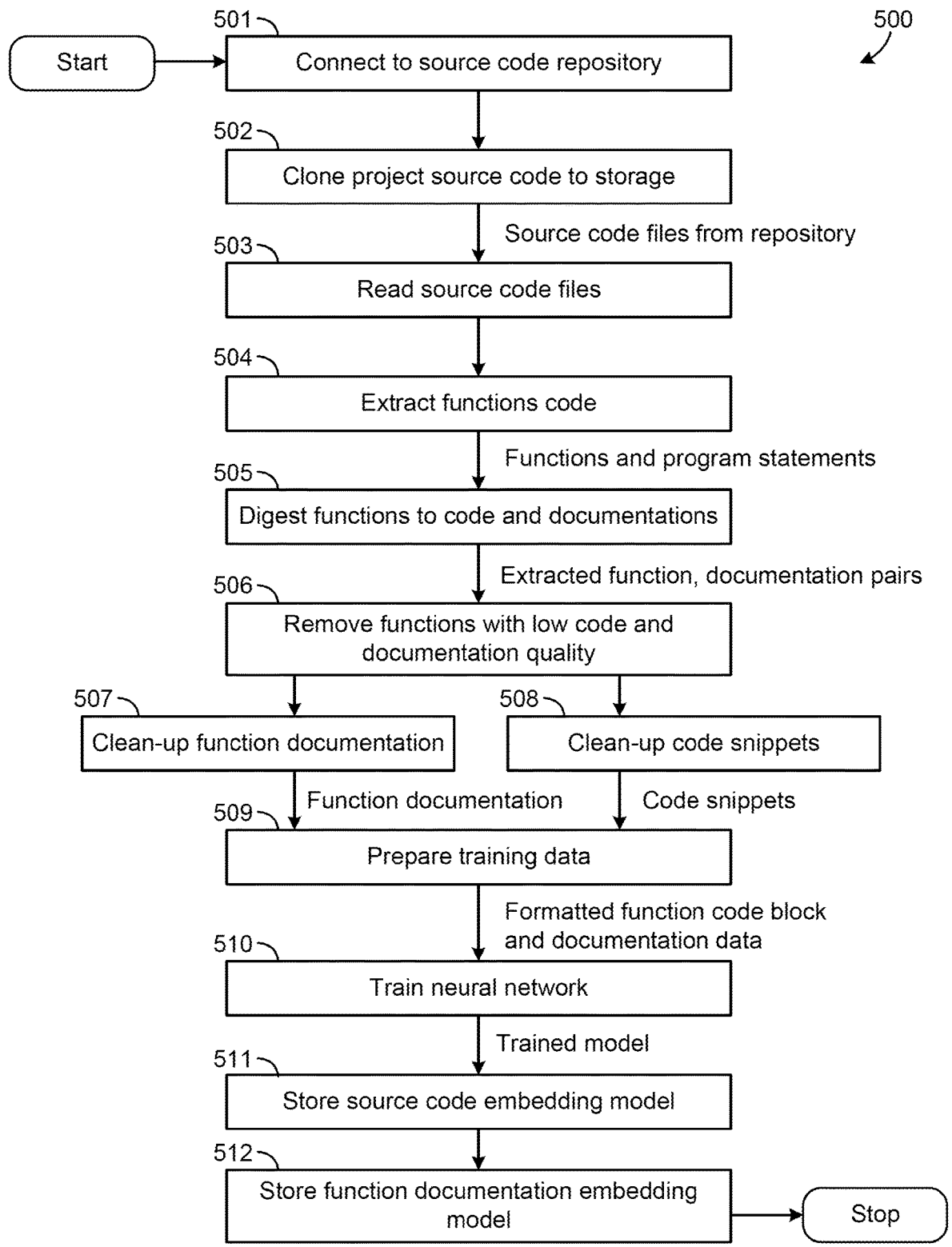
FIG. 5 shows the process of building Function Documentation Neural Network Model, according to some embodiments.

FIG. 5 shows the process 500 for building the Function Documentation Neural Network Model 118 which can be used by the NL Function Documentation Service 111 for predicting the documentation for a given snippet of code in a function (e.g., in step 305 of process 300). In some embodiments, process 500 is performed by the ML Model Builder 107. Process 500 involves using the data from source code functions and their associated documentations for training. The first steps are to connect to a source code repository (e.g., Code Repository 116) in step 501 and clone project source code to storage in step 502. In the next step 503, the source code files are read in accordance with the programming language rules and they are parsed to split the source code into functions (i.e., extract the functions code) with their associated documentation in step 504.

Then in step 505, the functions are digested to code and documentations. In some embodiments, the code snippets and their associated documentations are tagged together as a key value pair with a unique id for the functions based on the function name and its signature. A representative sample of the result step 505, for the sample source code provided as an input in step 301 of process 300 is shown below.

---
Example Key-Value Pairs of Code Snippets and Documentation
---
```
{
  "functions":[
    {
      "code":"public double interestEarned( ) {\n double amount = sumTransactions( );\n switch(accountType){\n case SAVINGS:\n if (amount <= 1000)\n return amount * 0.001;\n else\n return 1 + (amount-1000) * 0.002;\n case MAXI_SAVINGS:\n if (amount <= 1000)\n return amount * 0.02;\n if (amount <= 2000)\n return 20 + (amount-1000) * 0.05;\n return 70 + (amount-2000) * 0.1;\n default: \n return amount * 0.001;}\n }",
      "documentation":"Calculate the interest",
      "sha":"b746ac01c9f39de94cac2d56f665285b0b121v974"
    }
  ]
}
```

---

Then in step 506, functions with low code and documentation quality are removed. Step 506 may include evaluating the code snippets and the documentation against the set quality criteria, and they are scored on the function code metrics and the documentation metrics. Only the function code and documentation meeting the set quality criteria are taken to the next step for processing. In step 507, the function documentation is cleaned up. In some embodiments, natural language processing techniques are used in step 507 to pre-process the documentation with para phrasing techniques to generate additional sets of documentations with similar semantic meaning. This is followed by doing a similar process in 508 to clean up the code snippets to synthesize variations for the internal variable names being used in the function's lines of code to have wider data set for training. In step 508, the documentation is synthesized by paraphrasing and replacing the variable names within the function's lines of code to reduce bias in the predictions This synthesis of documentation and lines of code for a function helps to train the machine learning neural network algorithms in way to give better predictions while processing unseen function code snippets to generate the documentation for them.

In step 509, training data are prepared. In some embodiments, the sets of function documentations and function code snippets are split into different buckets for training, validation, and testing. The formatted function data generated in step 509 can be used to train the Function Documentation Neural Network Model 118 in step 510. Step 510 may include executing the neural network algorithm with training data and the validation data to build the model. While building the model, step 510 uses the validation dataset to improve the model accuracy. After building the model in step 510, the source code embedding model is stored in step 511 and the function documentation embedding model is stored in step 512. The models saved in steps 511 and 512 may include the neural network models for function documentation embedding and function code snippets embedding.

Figure 6A:
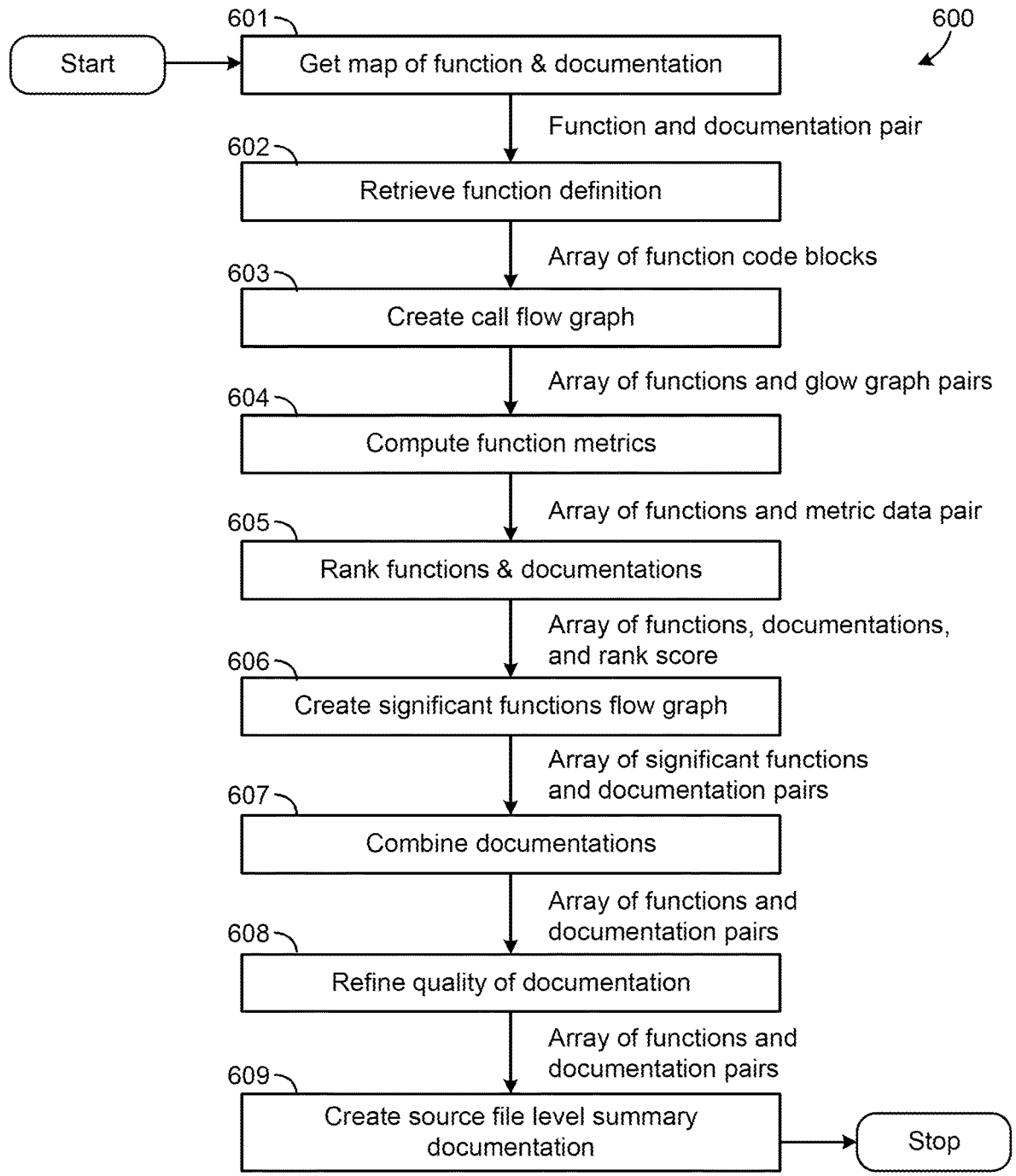
FIG. 6A shows an example process for performing the summarization of documentation, according to some embodiments.

FIG. 6A shows the process 600 for summarizing a set of function documentations to an abstract summary providing a concise and crisp summary with the context of the overall functionality of the program. In some embodiments, process 600 is performed by the NL Summarizer Service 112 and can be performed to accomplish step 309 of process 300. In the first step 601, a map of function and documentation is obtained. A list of the program functions and their generated documentation is created. In step 602, the function definition is retrieved and the function code snippet and its abstract syntax tree is created.

Figure 6B:
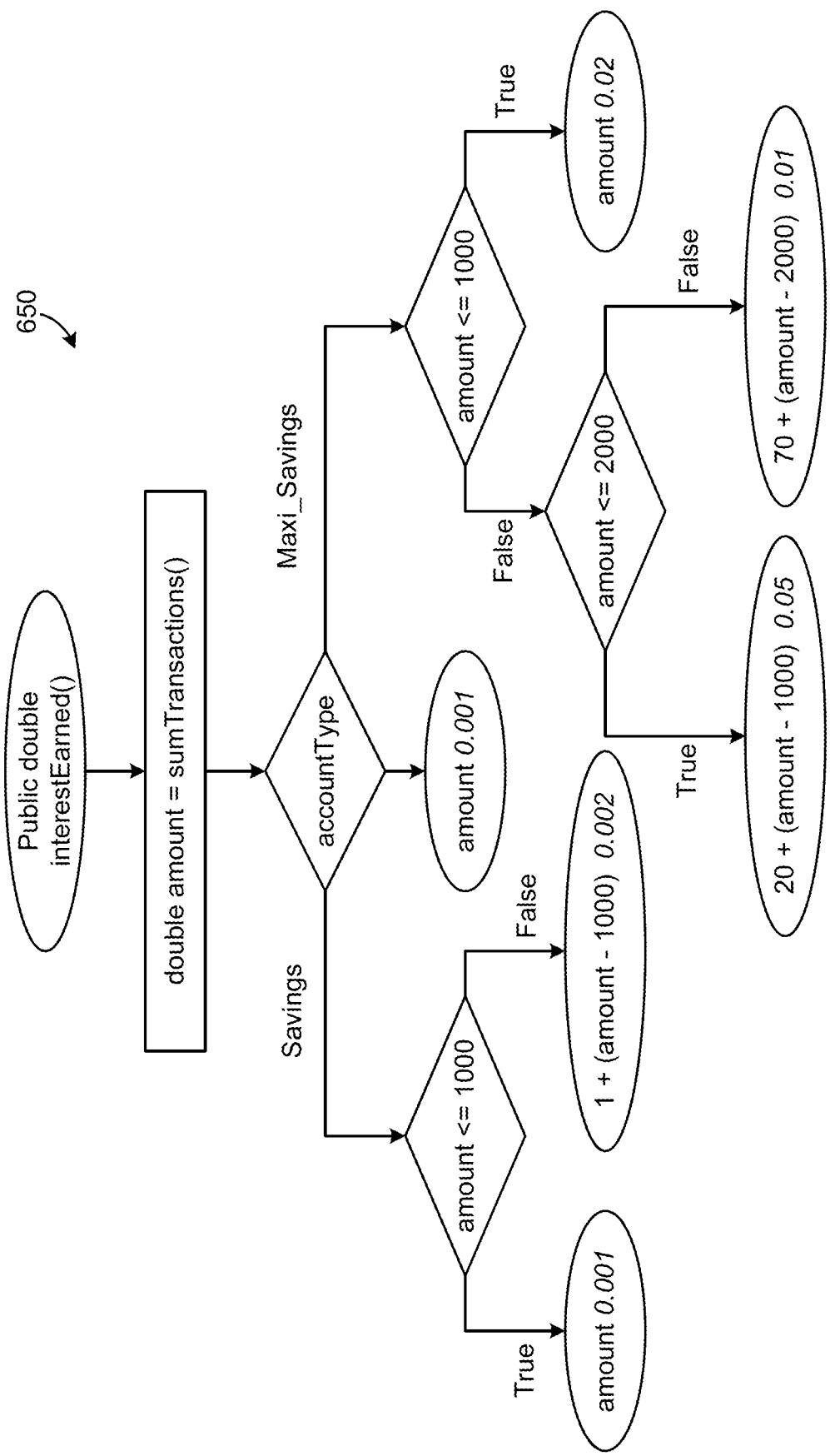
FIG. 6B shows an example representation of a call tree which can be generated for a function using the process of FIG. 6A, according to some embodiments.

In the next step 603, the call tree of each function (i.e., a call flow graph) is created. A call flow graph has details of the function calling other functions directly and indirectly through nested calls within the same project. With this call flow graph, the number of functions being called from a function as well as the number of dependent functions on a function can be calculated. The call tree will help to assign relevant merit score to the functions based on their place in the hierarchy of calls. A sample representation of a call tree 650 which can be generated for a function in step 603 for the sample source code provided as an input to step 301 of process 300 is illustrated in FIG. 6B.

In the next step 604, the function code level metrics are generated to score the function on different aspects. Some examples of the code level metrics calculated are code complexity, private or public accessible functions, internal function dependency metrics, number, and type of operations within the function. Then in the next step 605, the functions and documentations are ranked. In some embodiments, the generated documentations are scored on their quality using NLP techniques to measure the extent of meaning and subjects covered in the documentation. The functions are ranked based on the above metrics calculated. In step 606, a significant functions flow graph is created. Step 606 may include sequencing the critical functions based on their scores on their hierarchy within the source file.

Then in step 607, the generated documentations for the ranked functions are consolidated in the same sequence to get the consolidated documentation at the source file level. In step 608, the quality of the documentation is refined. Step 608 may include evaluating the generated documentation to validate for document quality against natural language parameters like semantic repetition, functional flow, grammar etc. Based on the evaluation scores, the documentation sentences are refined. Therefore, the documentations are refined by correcting the grammar and flow to generate the clean documentation. The next step 609 creates source file level summary documentation. Step 609 may include taking all the generated documentation and running it through the ML algorithm to summarize them. This summary provides the final file level summary as the documentation for the source code file. This procedure can be repeated for all the files in the submitted project to generate the documentation for the entire project.

Figure 7:
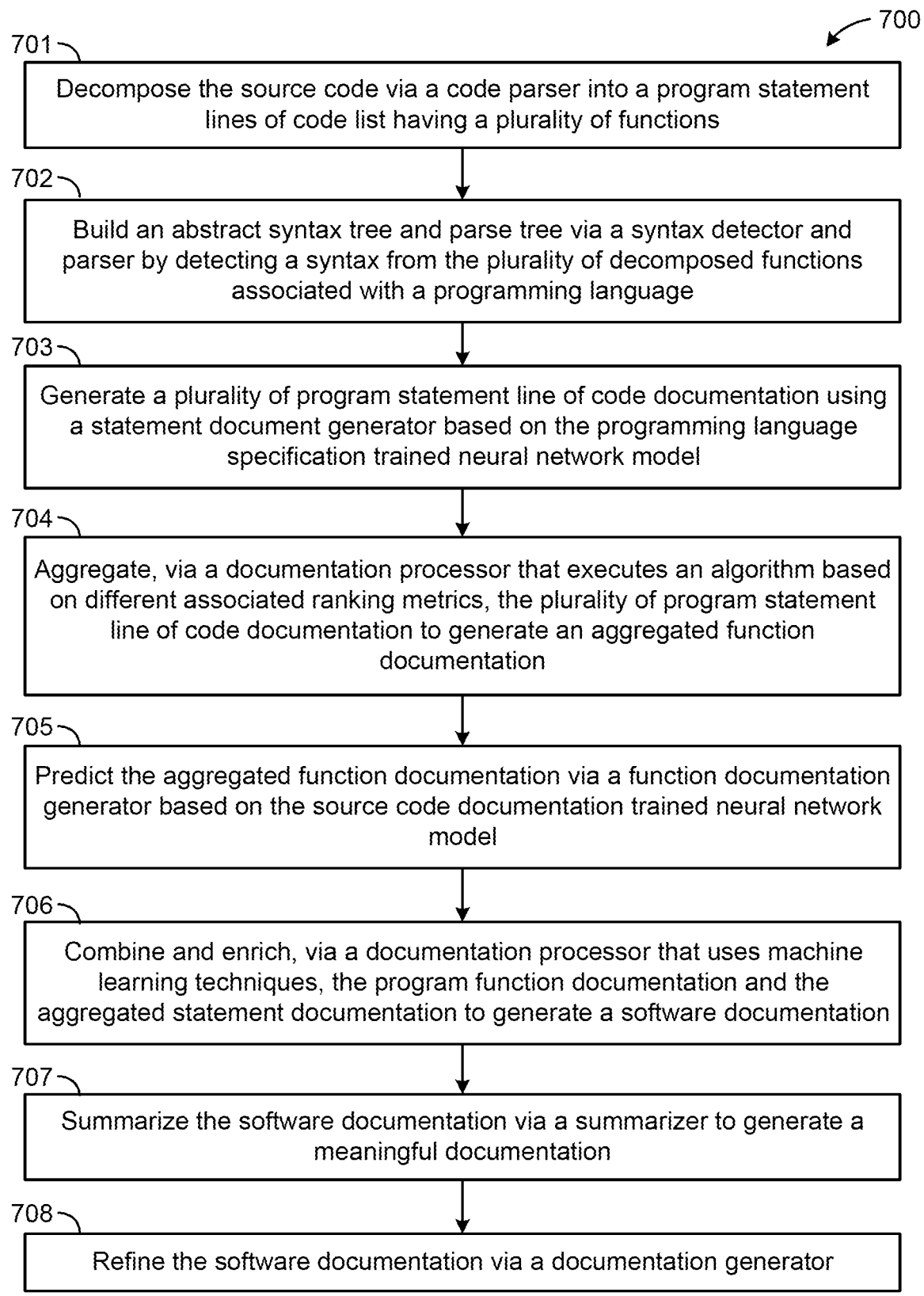
FIG. 7 shows a method flow diagram that indicates a computer program product for automated software natural language documentation, according to some embodiments.

FIG. 7 shows a process 700 that can be performed by a computer program product for automated software natural language documentation. Process 700 can be performed by one or more components of system 100 as previously described. The computer program product for automated software natural language documentation comprises a processor and memory storing instructions. The instructions when executed by the processor causes the processor to perform multiple steps. The processor decomposes the source code via a code parser, into a program statement lines of code list having a plurality of functions (step 701) and builds an abstract syntax tree and parse tree, via a syntax detector and parser, by detecting a syntax from the plurality of decomposed functions associated with a programming language (step 702). The processor then generates multiple program statement line of code documentation using a statement document generator based on the programming language specification trained neural network model (step 703). The processor then aggregates, via a documentation processor that executes an algorithm based on the different associated ranking metrics, the multiple program statement line of code documentation to generate an aggregated function documentation (step 704). The processor then predicts the function documentation via a function documentation generator based on the source code documentation trained neural network model (step 705). The processor combines and enriches, via a documentation processor that uses machine learning techniques, the program function documentation, and the aggregated statement documentation to generate a software documentation (step 706). The processor then summarizes the software documentation via a summarizer to generate a meaningful documentation (step 707) and refines the software documentation via a documentation generator (step 708).

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the order shown, or sequential order, to achieve desirable results. In addition, other actions may be provided, or actions may be eliminated, from the described flows, and other components may be added to, or removed from, the described systems. Accordingly, other implementations are within the scope of the following claims.

As multiple embodiments of the present invention have been elaborated above, it should be construed that they have been described by way of example alone, and not by way of limitation. Hence, the scope of the present invention should not be limited by any of the exemplary embodiments. Additionally, the invention is defined above in terms of multiple exemplary embodiments and applications. It should be understood that the several features and the functionality explained in one or more of the distinct embodiments are not limited in their applicability to the specific embodiment with which they are explained, but instead can be functional, by itself or in a defined combination, to one or more of the other embodiments of the invention, whether or not such embodiments are explained and whether or not such aspects are presented as being a part of a described embodiment.

What is claimed is:

1. A system for automatically generating natural language documentation for source code files, the system comprising:
    one or more processors and memory storing instructions that, when executed by the one or more processors, cause the one or more processors to perform operations comprising:
    parsing a source code file to extract a function and generate an abstract syntax tree;
    generating first natural language documentation for each of a plurality of program statements within the function using a programming language neural network model;
    building a function documentation neural network model by:
        extracting functions and associated documentation from a set of training source code files;
        evaluating the functions and the associated documentation relative to predetermined quality thresholds comprising at least one of a number of sentences, semantic quality of the documentation, and a date at which a corresponding training source code file was most recently updated;
        creating training data comprising multiple representations of source code of the training source code files by substituting variable names with auto-generated synthetic names;
        encoding the training data for training the function documentation neural network model using a machine learning algorithm; and
        building the function documentation neural network model and saving the function documentation neural network model to file storage;
    generating second natural language documentation for the function as a whole by processing a code snippet of the function using the function documentation neural network model;
    consolidating the first natural language documentation and the second natural language documentation at a function level, a source file level, and a project level to create consolidated natural language documentation; and
    summarizing multiple sentences of the consolidated natural language documentation into an abstract summary of the source code file by applying a set of rules.

2. The system of claim 1, the operations further comprising accepting a remote location of the source code file via a web GUI portal that allows a user to upload a zip file containing the source code file.

3. The system of claim 1, the operations further comprising:
    connecting to a code repository;
    searching the code repository for the source code file;
    downloading the source code file from the code repository to organized folder locations for each repository identifier; and
    maintaining status information to enable pausing and resuming the downloading based on network conditions.

4. The system of claim 1, wherein parsing the source code file to extract the function and generate the abstract syntax tree comprises:
    detecting a programming language and syntax of the source code file;
    parsing the source code file to extract the code snippet of the function from the source code file;
    generating an abstract syntax tree and a parse tree along with the code snippet of the function; and
    cleaning the code snippet of the function to remove non-executable content comprising one or more comments.

5. The system of claim 1, the operations further comprising building the programming language neural network model by:
    extracting data by reading language specifications and reference documentation;
    preparing training data comprising key constructs of a programming language comprising at least one of syntax expression, functions, function signatures, programming language key words, and associated documentation;
    encoding the training data for training the programming language neural network model using a machine learning algorithm; and
    building the programming language neural network model using the training data and saving the programming language neural network model to file storage.

6. The system of claim 1, wherein generating the first natural language documentation for each of the plurality of program statements within the function comprises:
    digesting the abstract syntax tree and deciphering a type of each program statement, operands, operators, and native functions in the program statement; and
    predicting overall documentation for the program statement using the programming language neural network model.

7. The system of claim 1, wherein generating the second natural language documentation for the function as a whole comprises:
    digesting the abstract syntax tree and extracting the code snippet of the function;
    encoding the code snippet of the function;
    retrieving matching snippet documentation from a trained knowledgebase using the function documentation neural network model; and
    ranking the matching snippet documentation for the code snippet of the function based on quality rules to select a top recommendation.

8. The system of claim 1, wherein consolidating the first natural language documentation and the second natural language documentation comprises:
    comparing the first natural language documentation and the second natural language documentation using corresponding confidence scores and a similarity between the first natural language documentation and the second natural language documentation;
    calculating a ratio of generated text to program statement lines of code in the function and program statement type, wherein the program statement type comprises at least one of declaration statements, expression statements, call statements, control flow statements, and input-output (i/o) statements; and
    consolidating the first natural language documentation and the second natural language documentation by applying rules that are based on attributes of the program statements and function metrics.

9. The system of claim 1, wherein summarizing the multiple sentences of the consolidated natural language documentation into the abstract summary of the source code file comprises:
- extracting meaningful sentences from a given paragraph by evaluating their structure, subject and context using NLP techniques; and
- encoding the meaningful sentences and summarizing the meaningful sentences using a summarizer machine learning model.

10. The system of claim 1, the operations further comprising refining the consolidated natural language documentation by assessing parameters of the consolidated natural language documentation using rules and natural language processing techniques, the parameters comprising at least one of semantic coherence, clarity, and conciseness.

11. A method for automatically generating natural language documentation for source code files, the method comprising:
- parsing a source code file to extract a function and generate an abstract syntax tree;
- training a programming language neural network model on a plurality of key constructs of a programming language comprising at least two of syntax expression, functions, function signatures, programming language keywords and associated documentation;
- generating first natural language documentation for each of a plurality of program statements within the function using a programming language neural network model;
- generating second natural language documentation for the function as a whole by processing a code snippet of the function using a function documentation neural network model;
- consolidating the first natural language documentation and the second natural language documentation at a function level, a source file level, and a project level to create consolidated natural language documentation; and summarizing the consolidated natural language documentation using a customized summarization routine.

12. The method of claim 11, further comprising generating a function signature for each of the plurality of program statements within the function using a technical signature parser for creating the abstract syntax tree.

13. The method of claim 11, further comprising:
- translating each source code statement to create the first natural language documentation.

14. The method of claim 11, further comprising training the function documentation neural network model using a set of training source code files and associated documentation, wherein the training comprises:
- parsing logic based on a language of the training source code files;
- evaluating a function of the training source code files and the associated documentation relative to predetermined quality standards comprising at least one of a number of lines of code in the function, a number and type of arguments to the function, a number of lines of documentation for the function, semantic quality of provided documentation for the function, a date at which a corresponding training source code file was most recently updated, and code complexity scores;
- synthesizing the associated documentation by paraphrasing and replacing variable names within the function to reduce bias in predictions of the function documentation neural network model; and
- encoding training data and executing a machine learning algorithm to train the function documentation neural network model.

15. The method of claim 11, further comprising:
- using the programming language neural network model to generate natural language documentation for each program statement in the function;
- consolidating the first natural language documentation and the second natural language documentation at the function level by assessing the natural language documentation for each program statement in the function; and
- extracting the code snippet of the function from the abstract syntax tree for use in processing the code snippet of the function using the function documentation neural network model.

16. The method of claim 11, wherein summarizing the consolidated natural language documentation comprises:
- generating recommendations for summarization of candidates based on at least one of a confidence score of the first natural language documentation and the second natural language documentation, a similarity between the first natural language documentation and the second natural language documentation, and a ratio of generated text to program statement lines of code in the function and program statement type;
- identifying significant functions in the source code file using a call graph that indicates bidirectional dependencies of the function;
- calculating code level metrics comprising at least one of complexity, publicly accessible functions, internal function dependency metrics, and a number and type of operations within the function; and
- executing a ranking algorithm to rank the function based on the code level metrics.

17. The method of claim 11, further comprising refining the consolidated natural language documentation by:
- evaluating a quality of the consolidated natural language documentation by evaluating factors comprising at least one of an extent of subject covered in the consolidated natural language documentation, semantic repetition, functional flow, and grammar; and
- refining the consolidated natural language documentation by correcting the grammar and flow to generate a clean documentation.

18. A computer program product for automatically generating natural language documentation for source code files, comprising a processor and memory storing instructions thereon, wherein the instructions when executed by the processor cause the processor to:
- parse a source code file to identify an executable function within the source code file and a plurality of program statement lines of code within the executable function;
- train a programming language neural network model on a plurality of key constructs of a programming language comprising at least two of syntax expression, functions, function signatures, programming language keywords and associated documentation;
- generate first natural language documentation for each of the plurality of program statement lines of code using a programming language specification trained neural network model;
- aggregate the first natural language documentation for each of the plurality of program statement lines of code to generate an aggregated natural language documentation for the function;

independent of the aggregated natural language documentation, generate a second natural language documentation for the function based on a code snippet of the function as a whole using a source code documentation trained neural network model; and combine the aggregated natural language documentation and the second natural language documentation to generate a combined natural language software documentation.

19. The computer program product of claim 18, wherein the instructions cause the processor to:

summarize and refine the combined software documentation by applying a predetermined set of summarization rules to generate a refined natural language software documentation; and at least one of store the refined natural language software documentation as a software documentation file or display the refined natural language software documentation to a user.

* * * * *